United States Patent
Cho

(10) Patent No.: US 9,698,859 B2
(45) Date of Patent: Jul. 4, 2017

(54) DEVICE FOR TRANSMITTING AND RECEIVING CARRIER AGGREGATION SIGNAL

(71) Applicant: Samsung Electronics Co., Ltd., Gyeonggi-do (KR)

(72) Inventor: Nam-Jun Cho, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 82 days.

(21) Appl. No.: 14/731,579

(22) Filed: Jun. 5, 2015

(65) Prior Publication Data

US 2016/0049986 A1    Feb. 18, 2016

(30) Foreign Application Priority Data

Aug. 12, 2014  (KR) .................. 10-2014-0104381

(51) Int. Cl.
   *H04B 1/48*       (2006.01)
   *H04L 5/14*       (2006.01)

(52) U.S. Cl.
   CPC ............. *H04B 1/48* (2013.01); *H04L 5/1461* (2013.01)

(58) Field of Classification Search
   CPC ..................... H04B 1/48; H04L 5/1461
   See application file for complete search history.

(56) References Cited

U.S. PATENT DOCUMENTS

| | | | |
|---|---|---|---|
| 9,271,239 B2* | 2/2016 | Hassan | H03F 1/0205 |
| 2012/0327825 A1* | 12/2012 | Gudem | H04B 1/3805 |
| | | | 370/310 |
| 2014/0192845 A1* | 7/2014 | Szini | H04B 7/0413 |
| | | | 375/219 |
| 2015/0341007 A1* | 11/2015 | Youssef | H03G 1/0029 |
| | | | 330/278 |

\* cited by examiner

*Primary Examiner* — Mohammad Anwar
(74) *Attorney, Agent, or Firm* — Cha & Reiter, LLC.

(57) ABSTRACT

Disclosed is a signal transmit and receive device capable of receiving and processing both a carrier-aggregated (CA) receive signal and a non-CA receive signal, and transmitting both a CA transmit signal and a non-CA transmit signal, through a common antenna. The CA receive signal and the non-CA receive signal may be amplified by receiving circuits having differing receiver sensitivities to optimize performance. The CA transmit signal and non-CA transmit signal may be provided at differing signal levels so as to minimize power consumption.

18 Claims, 4 Drawing Sheets

DEVICE FOR TRANSMITTING AND RECEIVING CARRIER AGGREGATION SIGNAL

CLAIM OF PRIORITY

This application claims the priority under 35 U.S.C. §119(a) to Korean Application Serial No. 10-2014-0104381, which was filed in the Korean Intellectual Property Office on Aug. 12, 2014, the entire content of which is hereby incorporated by reference.

TECHNICAL FIELD

The present disclosure relates to a device provided at a front end of a signal transmit and receive device.

BACKGROUND

Carrier aggregation technology is being used for aggregation of transmit bandwidths and spectra. One prominent application of carrier aggregation is with "Long Term Evolution (LTE)-Advanced" capable communications. Carrier aggregation (CA) was considered an initial step of LTE Advanced, offering higher data rates for mobile terminals in a cell.

In carrier aggregation technology, data in a plurality of different frequency bands is modulated, and the plural modulated signals are transmitted and received through an antenna. In order to receive signals transmitted through carrier aggregation technology, a terminal receives the signals at different frequency bands using a filtering method. To this end, the terminal includes either a plurality of antennas capable of receiving signals in different bands, or a multi-band antenna.

However, with space constraints, it is desirable to minimize the space allocated for antennas within the terminal.

SUMMARY

In the related art, in order to address the aforementioned problem, a method is used for splitting signals provided from a single antenna into signals in a higher band and signals in a lower band using a component, such as a duplexer, for splitting signals. However, in this case, a signal path is split into one for the higher band and the other for the lower band. As such, other means would be required to process carrier-aggregated signals in the same band, i.e., signals being integrated into first and second higher bands or signals being integrated into first and second lower bands. For instance, a plurality of splitters may be arranged in series such that received signals can sequentially pass therethrough so as to isolate the desired frequencies. However, large signal loss due to the splitters leads to significant reduction in signal sensitivity and excessive power consumption.

In addition, signals that do not need carrier aggregation pass through the splitters so that unnecessary loss of the signals may arise.

Certain embodiments disclosed herein may solve such problems in the related art. An aspect of the present disclosure is to provide a signal transmit and receive device that can process carrier aggregation without a plurality of antennas.

Another aspect of the present disclosure is to provide a signal transmit and receive device that can minimize loss of carrier-aggregated signals even though a single antenna is used.

Furthermore, another aspect of the present disclosure is to provide a signal transmit and receive device that can minimize or reduce loss of carrier-aggregated signals and non-carrier-aggregated signals while simultaneously transmitting and receiving the carrier-aggregated signals and the non-carrier-aggregated signals.

In accordance with one aspect of the present disclosure, a signal transmit and receive device includes an antenna; a switching unit, first and second signal processing units, and a transmit/receive (T/R) unit. The switching unit is connected to the antenna and is operative to switch toward different paths, a first receive signal which uses carrier aggregation and a second receive signal which does not use carrier aggregation. The switching unit may also switch first and second transmit signals applied from the different paths, which use and do not use carrier aggregation, respectively, to the antenna. The first signal processing unit is configured to split the first receive signal provided by the switching unit into first and second aggregation receive signals and to integrate first and second aggregation transmit signals to form the first transmit signal applied to the switching unit.

The second signal processing unit may process the second receive signal provided by the switching unit and the second transmit signal to be applied to the switching unit. The T/R unit may include a receive amplifier that amplifies each of the first and second aggregation receive signals, and the second receive signal output from the second signal processing unit.

The receive amplifier of the T/R unit may amplify one of the first and second aggregation receive signals using a receiver configured for a first receiving sensitivity, and amplify the second receive signal output from the second signal processing unit using a receiver configured for a second receiving sensitivity.

The T/R unit may include a transmit amplifier that amplifies at least one of the first and second transmit aggregation signals, and the second transmit signal, to different levels.

In accordance with another aspect, a method for processing communication signals includes: receiving, by an antenna, a first receive signal which uses carrier aggregation and a second receive signal which does not use carrier aggregation; switching the first and second receive signals towards first and second paths, respectively; splitting the first receive signal switched to the first path to form first and second aggregation receive signals; processing the second receive signal switched to the second path; amplifying at least one of the first and second aggregation receive signals with receiver circuitry having a first receiver sensitivity; amplifying the processed second receive signal with receiver circuitry having a second receiver sensitivity; transmitting a first transmit signal that uses carrier aggregation via the first path and a second transmit signal that does not use carrier aggregation via the second path; and switching the first and second transmit signals from the first and second paths to the antenna.

BRIEF DESCRIPTION OF THE DRAWINGS

The above and other aspects, features, and advantages of the presently disclosed technology will be more apparent from the following detailed description taken in conjunction with the accompanying drawings, in which.

DETAILED DESCRIPTION

Figure 1:
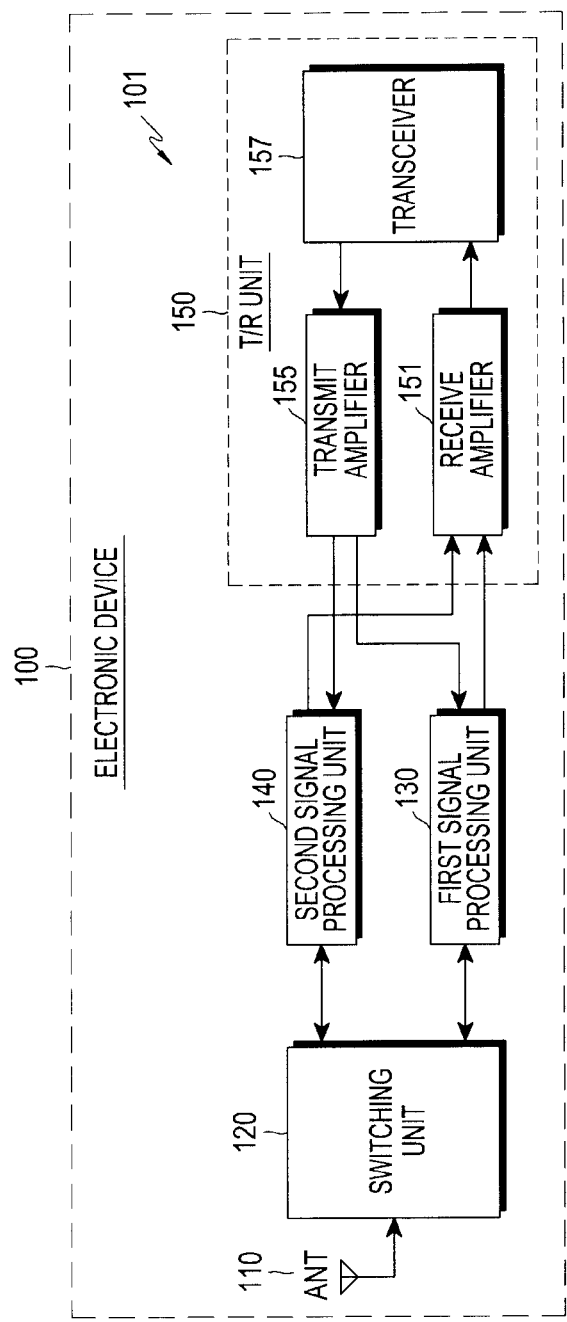
FIG. 1 is a block diagram illustrating the configuration of a signal transmit/receive device according to an embodiment of the present disclosure.

Hereinafter, various embodiments of the present disclosure will be described with reference to the accompanying drawings. The technology of the present disclosure may be modified in various forms and include various embodiments, but specific examples are illustrated in the drawings and described in the description. However, the description is not intended to limit the claimed subject matter defined by the appended claims to the specific embodiments, and it shall be appreciated that the claimed subject matter encompasses all changes, equivalents and substitutions belonging to the idea and technical scope of the present disclosure. In the description of the drawings, identical or similar reference numerals are used to designate identical or similar elements.

The term "include" or "may include" refers to the existence of a corresponding disclosed function, operation or component which can be used in various embodiments of the present disclosure and does not limit one or more additional functions, operations, or components. Further, as used in embodiments of the present disclosure, the terms "include", "have" and their conjugates may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

The expression "1st", "2nd", "first", or "second" used in various embodiments of the present disclosure may modify various components of various embodiments but does not limit the corresponding components. For example, the above expressions do not limit the sequence and/or importance of the corresponding elements. The expressions may be used to distinguish a component element from another component element. For example, a first user device and a second user device indicate different user devices although both of these are user devices. For example, without departing from the scope of the present disclosure, a first component element may be named a second component element. Similarly, the second component element also may be named the first component element.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

In the present disclosure, the terms are used to describe a specific embodiment, and are not intended to limit the claimed subject matter. As used herein, singular forms are intended to include the plural forms as well, unless the context clearly indicates otherwise.

Unless defined differently, all terms used herein, which include technical terminologies or scientific terminologies, have the same meaning as that understood by a person skilled in the art to which the present disclosure pertains. Such terms as those defined in a generally used dictionary are to be interpreted to have the contextual meanings as understood in the relevant field of art, and are not to be interpreted to have excessively formal meanings unless clearly defined in the present disclosure.

FIG. 1 is a block diagram illustrating a configuration of a signal transmit/receive device, 101, according to an embodiment of the present disclosure. Signal transmit/receive (T/R) device 101 includes an antenna 110, a switching unit 120, a first signal processing unit 130, a second signal processing unit 140, and a transmit/receive (T/R) unit 150. Signal T/R device 101 may be part of an electronic device 100, which may be any communication device capable of receiving and transmitting carrier aggregated signals such as a smartphone, a tablet PC, a wearable device, and so forth.

The antenna 110 may be a multi-band antenna having a structure capable of receiving signals in first and second bands. For example, the antenna 110 may simultaneously receive a signal in a low band of 1 GHz or lower and a signal in a high band of 1.7 GHz or higher. Herein, a phrase such as "band of 1 GHz" refers to a frequency band that includes 1 GHz, typically a band that is approximately centered around 1 GHz. Likewise, a "band of 1.7 GHz" may refer to a frequency band approximately centered around 1.7 GHz.

The switching unit 120 may switch the signals received through the antenna 110 toward the first or second signal processing unit 130 or 140. For example, a CPU (not shown) of the device 100 or a processor (not shown) within the switching unit 120 identifies whether signals received from a communication network component, such as a base station, are carrier-aggregated (CA) signals, and controls the internal switching paths of the switching unit 120 accordingly. The switching unit 120 may provide the signals received through the antenna 110 (referred to as "receive signals" or "reception signals") to the first signal processing unit 130 when the receive signals are carrier-aggregated signals and to the second signal processing unit 140 when the receive signals are not carrier-aggregated signals.

The first signal processing unit 130 processes the CA signals. For example, the first signal processing unit 130 may receive at least one CA signal and separate, from the at least one CA signal, first and second "aggregation receive signals" in different bands. These different bands may be two bands normally identified distinctly from one another such that the first and second aggregation receive signals are considered "inter-band" signals. Alternatively, the two different bands are normally considered part of a common, wider band and are considered "intra-band" signals. In addition, the first signal processing unit 130 may transmit CA signals. To this end, the first signal processing unit 130 receives first and second "aggregation transmit signals" (which are transmit signals to be carrier-aggregated) from the T/R unit 150. First signal processing unit 130 (and frequency multiplexes)modulates the first and second aggregation transmit signals into the modulated signals containing signals in different bands, i.e., forming a carrier-aggregated (CA) transmit signal. The first signal processing unit 130 may include a first splitter for processing signals in a lower band and a second splitter for processing signals in a higher band. (Further description is provided below in the discussion of FIG. 2.) In addition, the first signal processing unit 130 may include a plurality of duplexers connected to the first splitter and a plurality of duplexers connected to the second splitter. For example, the lower band may correspond to a band of 1 GHz or lower, and the higher band may correspond to a band of 1.7 GHz or higher. As described above, the first signal processing unit 130 includes the first and second splitters and the plural duplexers connected to the first and second splitters; therefore, device 100 may transmit/receive CA signals in multiple lower and/or higher bands. In addition, through the aforementioned configuration, it is possible to transmit/receive CA signals in multiple lower and/or higher bands using a single antenna and minimize loss of the transmitted/received CA signals.

The first signal processing unit 130 processes CA signals, whereas the second signal processing unit 140 processes non-CA signals. For example, the second signal processing unit 140 provides receive signals to T/R unit 150 and provides transmit signals (also referred to as "transmission signals"), transferred from T/R unit 150, to the antenna 110 through the switching unit 120.

The T/R unit 150 may demodulate the receive signals provided from the first and second signal processing units 130 and 140 to detect data, and may modulate data to be transmitted to provide the modulated data to the first and second signal processing units 130 and 140. T/R unit 150 in particular may include a receive amplifier 151 for amplifying the receive signals provided from the first and second signal processing units 130 and 140. When the first signal processing unit 130 splits the CA receive signals into the first and second aggregation receive signals, signal loss may arise. Accordingly, the signals provided from the first signal processing unit 130 may have low signal power due to signal loss, as compared with the signals provided from the second signal processing unit 140. Therefore, the receive amplifier 151 may amplify the signals provided from the first signal processing unit 130 using a receive amplifier configured for a higher gain and/or a lower noise figure as compared to a receive amplifier designated for the signals from unit 140 (effectively routing the CA based signals from unit 130 through a receiver with higher sensitivity).

Furthermore, for the transmit path, when the first signal processing unit 130 subjects the first and second aggregation transmit signals to carrier aggregation, signal loss may arise. Accordingly, if the CA signals to be transmitted and the non-CA signals to be transmitted are amplified to the same level, due to the signal losses in the first signal processing unit 130, the CA signal finally outputted at the antenna 170 may be too low. Therefore, the T/R unit 150 may further include a transmit amplifier 155 for amplifying, to different levels, signals to be provided to the first and second signal processing units 130 and 140, respectively, with a higher signal level inputted to unit 130. The transmit amplifier 155 may be configured such that the signal to be provided to the second signal processing unit 140 has a power of 25 dBm, with the relevant amplifier therein designed for maximum efficiency at the corresponding power. Moreover, transmit amplifier 155 may be configured such that the signal to be provided to the first signal processing unit 130 has a power of 26 dBm and the amplifier therein having maximum efficiency at the corresponding power. (Different amplifiers within transmit amplifier 155 may be used for the respective CA and non-CA transmit signals.)

As described above, the transmit amplifier 155 can perform the amplification such that the CA signals to be transmitted and the non-CA signals to be transmitted are transmitted by amplifiers operating at the maximum efficiency, thereby minimizing power consumption.

Figure 2:
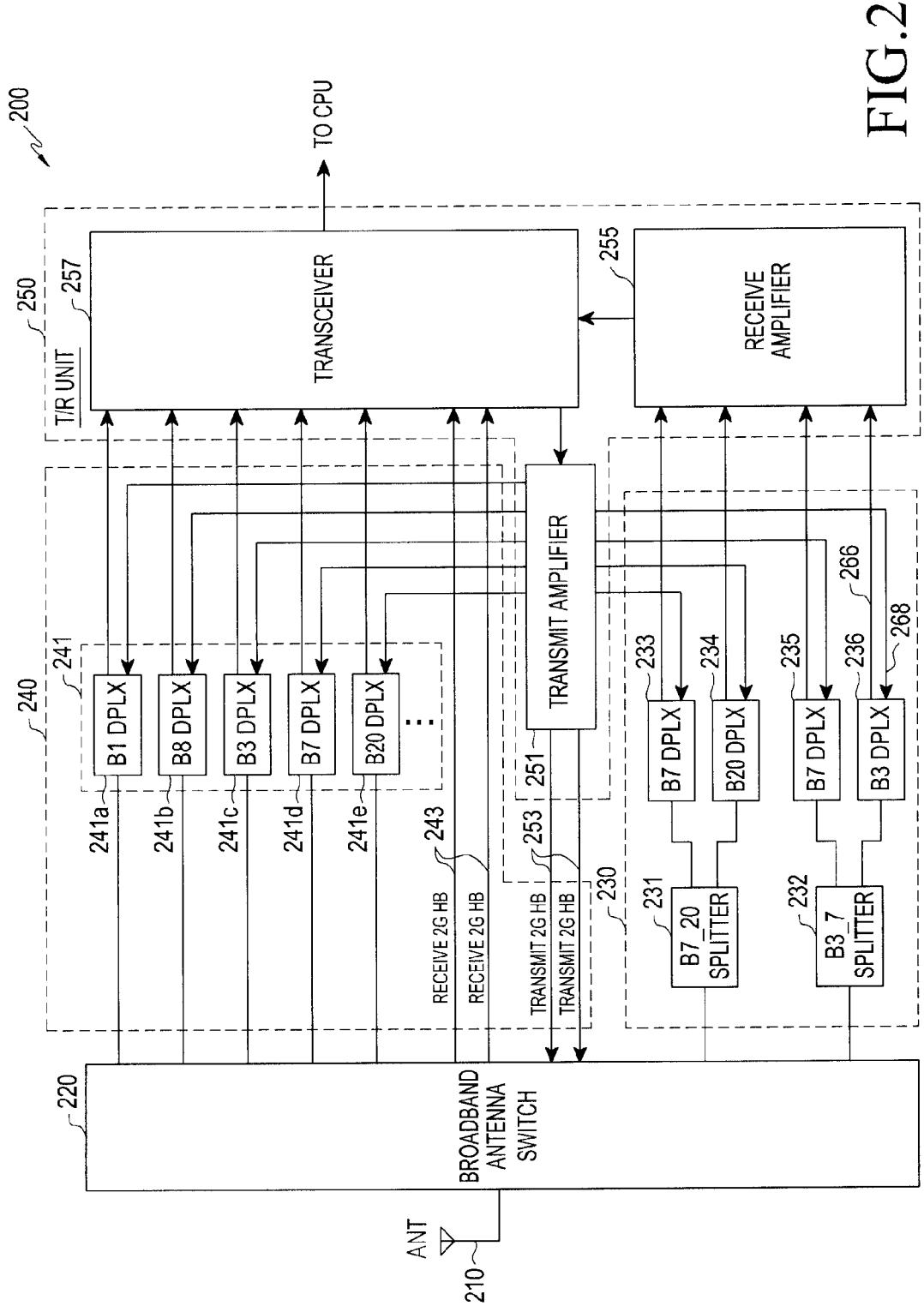
FIG. 2 is a block diagram illustrating an example configuration of signal transmit/receive device of FIG. 1.

FIG. 2 is a block diagram illustrating an example configuration 200 of the signal transmit/receive (T/R) device 101 of FIG. 1. Signal T/R device 200 includes an antenna 210, a switching unit 220, a first signal processing unit 230, a second signal processing unit 240, and a transmit/receive (T/R) unit 250.

The antenna 210 may be a multi-band antenna having a structure capable of receiving signals in first and second bands. For example, the antenna 210 may simultaneously receive a signal in a low band of 1 GHz or lower and a signal in a high band of 1.7 GHz or higher.

The switching unit 220 may switch the signals, received through the antenna 210, toward the first or second signal processing unit 230 or 240. For example, a CPU (not shown) of the electronic device 100, or a processor (not shown) within antenna switch 220 identifies signals received from an external communication network component, such as a base station, to determine whether the transmitted signals are carrier-aggregated signals. The CPU or other processor may control the internal switching paths of switching unit 220 so as to provide the signals received through the antenna 210 to the first signal processing unit 230 when the received signals are CA signals and to the second signal processing unit 240 when the received signals are not CA signals.

The first signal processing unit 230 processes the CA signals. For example, the first signal processing unit 230 may receive the CA signals and separate first and second "aggregation receive signals" in different bands from the CA signals. In addition, the first signal processing unit 230 may transmit CA signals. To this end, the first signal processing unit 230 receives first and second "aggregation transmit signals", which are transmit signals to be carrier aggregated, from the T/R unit 250 and integrates the first and second aggregation transmit signals into signals containing frequencies in different bands to form a CA transmit signal. The first signal processing unit 230 in particular may include a first splitter 231 for processing signals in a lower band of 1 GHz or lower and a second splitter 232 for processing signals in a higher band of 1.7 GHz or higher. The first signal processing unit 230 may include a first duplexer 233 and a second duplexer 234 which are connected to the first splitter 231. In addition, the first signal processing unit 230 may include a third duplexer 235 and a fourth duplexer 236 which are connected to the second splitter 232. In FIG. 2, labels such as "B3" and "B7" denote example frequency bands, and a label such as "B3_7" for splitter 232 denotes an example of the splitter 232 outputting receive signals in bands B3 and B7 on respective output ports. A duplexer such as "B3 Duplexer" 236 outputs a receive signal in the corresponding band B3 out an output line 266, and may concurrently pass a transmit signal on an input transmit path 268 in band B3 towards the splitter 232.

CA receive signals are provided to the first and second splitters 231 and 232. The first splitter 231 splits the signals into two signals and provides the split signals to the first and second duplexers 233 and 234. Accordingly, the first duplexer 233 outputs the signal in a first low band (e.g., B7) among the split signals, and the second duplexer 234 outputs the signal in a second low band (e.g. B20) among the split signals. The second splitter 232 also splits the received signals into two signals and provides the split signals to the third and fourth duplexers 235 and 236. Accordingly, the third duplexer 235 outputs the signal in a first high band (e.g. B7) among the split signals, and the fourth duplexer 236 outputs the signal in a second high band among the split signals. Suitable band pass filtering, e.g., by path switching, occurring within the splitters 231, 232 enables the separation of the respective bands B3, B7 and B20. For example, B7 of duplexers 235 is received from B7 splitter 231, if the band B7 is not the signal in high band, B7 is not received from splitter 231 to duplexers 235, and B7 of duplexers 233 is received from B7 splitter 232, if the band B7 is not the signal in the low band, B7 is not received from splitter 232 to duplexers 233.

For example, the CA receive signals may be obtained by aggregating signals in multiple low bands of 1 GHz or lower, by aggregating signals in multiple high bands of 1.7 GHz or higher, or by aggregating signals in a low band of 1 GHz or lower and signals in a high band of 1.7 GHz or higher (thus providing an inter-band CA signal in the latter case). The bands of signals constituting the CA receive signals may be identified by the CPU or other processor of device 100 via other signals received from an external communication network (e.g., a base station).

When CA receive signals are obtained by aggregating signals in multiple low bands of 1 GHz or lower, the carrier-aggregated receive signals may include aggregation receive signals in a first low band and aggregation receive signals in a second low band. The first signal processing unit 230 may include a processor to identify that the CA receive signals include the aggregation receive signals in the first low band and the aggregation receive signals in the second low band, by using signals received from an external communication network (e.g., a base station), and then implement suitable band pass filtering and open a path through which the aggregation receive signals in the first low band and the aggregation receive signals in the second low band are transferred. (Alternatively, signal processing unit 230 receives control signals from another processor such as a CPU to control its internal paths.) Therefore, the CA receive signals may pass through the first splitter 231, the aggregation receive signals in the first low band may be output through the first duplexer 233, and the aggregation receive signals in the second low band may be output through the second duplexer 234. Furthermore, even though the CA receive signals pass through the second splitter 232, the carrier-aggregated receive signals may not pass through the third and fourth duplexers 235 and 236 configured in different bands. Thus, the aggregation receive signals in the first low band and the aggregation receive signals in the second low band may be provided to the T/R unit 250.

When CA receive signals are obtained by aggregating signals in multiple high bands of 1.7 GHz or higher, the CA receive signals may include aggregation receive signals in a first high band and aggregation receive signals in a second high band. (These may be sometimes be referred to as intra-band CA signals.) The first signal processing unit 230 may identify that the CA receive signals include the aggregation receive signals in the first high band and the aggregation receive signals in the second high band, by using signals received from an external communication network (e.g., a base station), and then implement suitable filtering and open a path through which the aggregation receive signals in the first high band and the aggregation receive signals in the second high band are transferred. Therefore, the CA receive signals may pass through the second splitter 232, the aggregation receive signals in the first high band may be output through the third duplexer 235, and the aggregation receive signals in the second high band may be output through the fourth duplexer 236. Furthermore, in this example, even though the CA receive signals in the first and second high bands may pass through the first splitter 231, the CA receive signals may not pass through the first and second duplexers 233 and 234 since they are configured for different bands (i.e., optimized/matched for different bands), so that the high band signals input thereto may be essentially attenuated to noise. Thus, the aggregation receive signals in the first high band and the aggregation receive signals in the second high band may be provided to the T/R unit 250 just through the duplexers 235 and 236.

When CA receive signals are obtained by aggregating signals in a low band of 1 GHz or lower and signals in a high band of 1.7 GHz or higher, the CA receive signals may include aggregation receive signals in a first low band and aggregation receive signals in a first high band. In this case, the first signal processing unit 230 may identify that the CA receive signals include the aggregation receive signals in the first low band and the aggregation receive signals in the first high band, by using signals received from an external communication network (e.g., a base station), and then open a path through which the aggregation receive signals in the first low band and the aggregation receive signals in the first high band are transferred. Accordingly, the CA receive signals may pass through the first splitter 231, the aggregation receive signals in the first low band may be output through the first duplexer 233, and the aggregation receive signals in the first high band may be output through the third duplexer 235. Thus, the aggregation receive signals in the first low band and the aggregation receive signals in the first high band may be provided to the T/R unit 250. In another example, aggregation receive signals in a second low band and aggregation receive signals in a second high band may also be provided to the transmission/reception unit 250 through the second and fourth duplexers 234 and 236, respectively.

As described above, the first signal processing unit 230 according to the present disclosure may process variously configured aggregation receive signals. In addition, through the aforementioned configuration, it is possible to transmit/receive carrier aggregation signals in multiple lower or higher bands using a single antenna and minimize loss of the transmitted/received CA signals.

The first signal processing unit 230 processes CA signals, whereas the second signal processing unit 240 processes non-CA signals. For example, the second signal processing unit 240 provides receive signals to the T/R unit 250 and transmit signals, transferred from the T/R unit 250, to the antenna 210 through the switching unit 220. The second signal processing unit 240 may include a plurality of duplexers 241 that pass signals in different bands therethrough, respectively. The second signal processing unit 240 may identify the bands of transmitted and received signals, by using signals received from an external communication network (e.g., a base station), and open the duplexers 241 and paths corresponding to the bands, respectively. (Alternatively, another processor such as a CPU identifies the relevant bands and controls signal processing unit 240 accordingly.)

The T/R unit 250 may demodulate the receive signals provided from the first and second signal processing units 230 and 240 to detect data, and may modulate data to be transmitted to provide the modulated data to the first and second signal processing units 230 and 240. The T/R unit 250 in particular may include a receive amplifier 255 for amplifying the receive signals provided from the first and second signal processing units 230 and 240. When the first signal processing unit 230 splits the CA receive signals into the first and second aggregation receive signals, signal loss may arise. Accordingly, at the input ports of receive amplifier 255, the signals provided from the first signal processing unit 230 may have lower signal levels than the signals provided from the second signal processing unit 240. Therefore, the receive amplifier 255 may route the signals provided from the first signal processing unit 230 to a receiver with higher sensitivity.

For transmit signals, splitters 231 and 232 act as combiners. That is, transmit signals output from duplexers 233 and 234 are combined by splitter 231 to form a CA transmit signals (this signal is also a frequency multiplexed signal since the outputs of duplexers 233 and 234 are signals of different respective bands). Thus, splitter 231 may also be referred to as a "splitter/combiner" 231. Likewise, splitter 232 has performs a combining/multiplexing function for the transmit path, and provides a CA transmit signal with the carrier signals from duplexers 235 and 236 aggregated. Furthermore, for the transmit path, when the first signal processing unit 230 subjects the first and second aggregation transmit signals to carrier aggregation, signal loss may arise. Accordingly, if CA signals to be transmitted and non-CA signals to be transmitted are amplified to the same level, due to the signal losses in the first signal processing unit 230, the CA signal finally output at the antenna 210 may be too low. Therefore, the T/R unit 250 may further include a transmit amplifier 251 for amplifying, to different levels, signals to be provided to the first and second signal processing units 230 and 240, respectively. For example, the transmit amplifier 251 may amplify the signal provided to the first signal processing unit 230 to a higher level than the signal provided to the second signal processing unit 240. As one example, transmit amplifier 251 may be configured such that the signal provided to the second signal processing unit 240 has a power of 25 dBm and the relevant amplifier therein having maximum efficiency at the corresponding power. Transmit amplifier 251 may also be configured such that the signal to be provided to the first signal processing unit 230 has a power of 26 dBm and the relevant amplifier therein having maximum efficiency at the corresponding power. (Either a single amplifier handling both signals may be optimized at the corresponding signal power levels, or different optimized amplifiers handling the respective CA and non-CA signals, may be provided.) As described above, the transmit amplifier 251 can perform the amplification such that the CA signals to be transmitted and the non-CA signals to be transmitted are amplified and routed with circuitry configured for maximum or near maximum efficiency for the respective signal characteristics, thereby minimizing power consumption.

Figure 3:
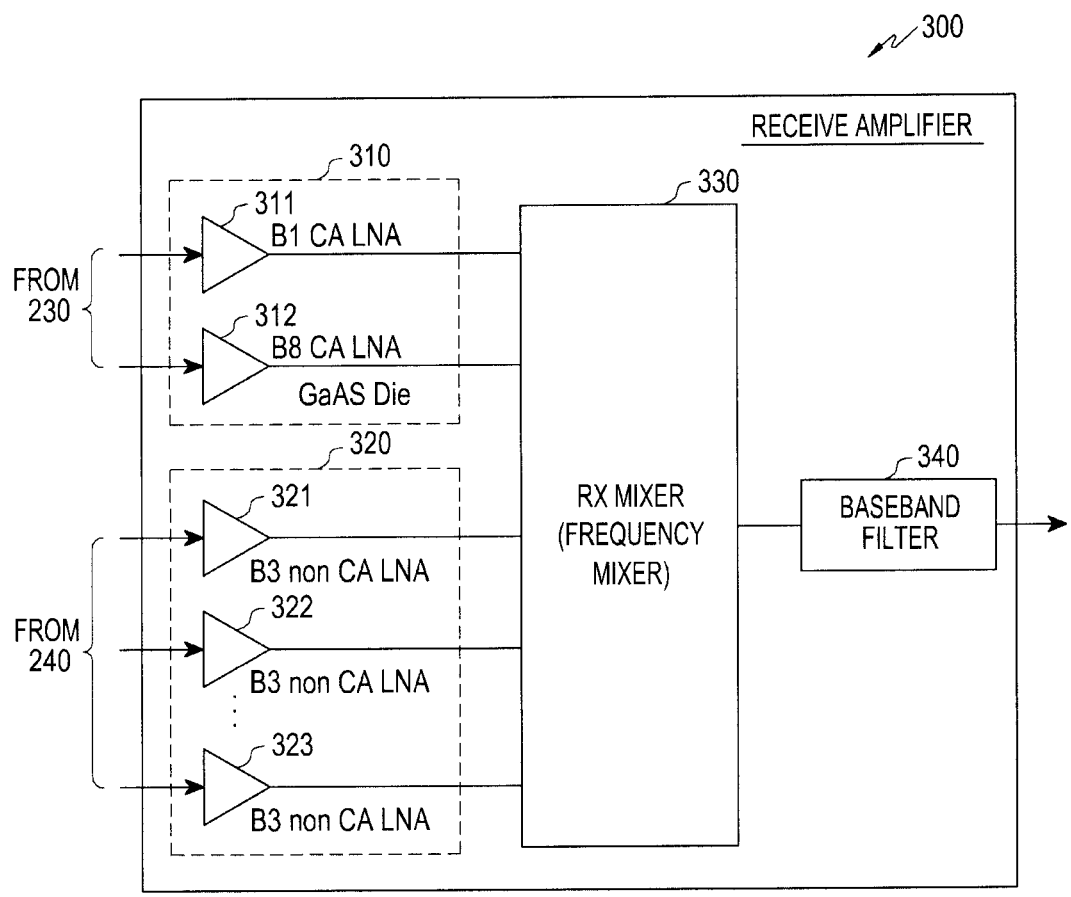
FIG. 3 is a block diagram illustrating an example configuration of a receive amplifier provided in various embodiments of the present disclosure.

The antenna switch 220 may also provide receive signals on paths 243 to the transceiver 257, which may be second generation (2G) high band (HB) signals. Transceiver 257 may provide 2G transmit signals through transmit amplifier 251, which are outputted to the antenna switch 220 on paths 253. FIG. 3 is a block diagram illustrating the configuration of a receive amplifier provided in various embodiments of the present disclosure. Receive amplifier 300 is an example of receive amplifier 255 of FIG. 2 and receive amplifier 151 of FIG. 1, and may include at least one first receive amplifier 310 for processing aggregation receive signals and at least one second receive amplifier 320 for processing non-aggregated receive signals. In addition, the receive amplifier 300 may include a frequency mixer 330 for mixing frequencies of received signals and a baseband processing unit 340 for filtering the frequency-mixed signals and outputting signals in the baseband.

Figure 4:
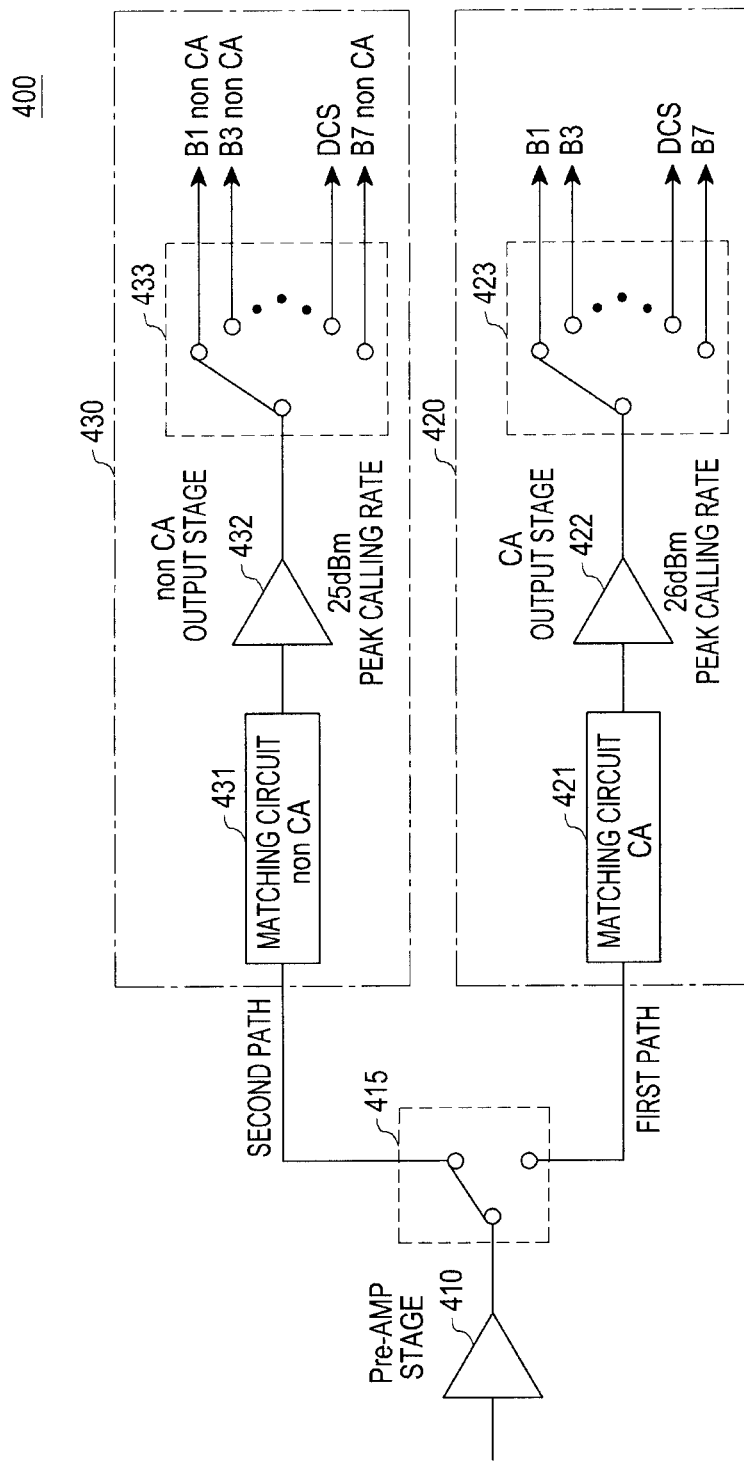
FIG. 4 is a block diagram illustrating an example configuration of a transmit amplifier provided in various embodiments of the present disclosure.

Carrier-aggregated receive signals are split through a component such as the splitter included in the first signal processing unit 130 or 230 provided in the various embodiments of the present disclosure and then input to the first receive amplifier 310. Accordingly, the signal level of the CA signals input to the first receive amplifier 310 may be weakened due to the signal loss caused by the first signal processing unit 130 or 230. Therefore, in order to handle the lower signal power levels and output a signal with requisite signal/noise (S/N) ratio, the first receive amplifier 310 may preferably include a highly sensitive receiver with a low noise figure. For example, the first receive amplifier 310 may include an amplifier manufactured through the GaAS process with a low noise figure. The second receive amplifier 320 may include a receiver manufactured through the CMOS process. Through packaging, the second receive amplifier 320 including the receiver manufactured through the CMOS process may be integrated with the first receive amplifier 310 including the amplifier manufactured through the GaAS process, thereby amplifying CA receive signals and non-CA signals with receiver circuits having suitable receiver sensitivity. For example, first receiver circuitry comprising the first amplifier 310 may have a better (lower) noise figure than second receiver circuitry comprising the second amplifier 320. That is, the first receiver circuitry may have a higher receiver sensitivity than the second receiver circuitry. FIG. 4 is a block diagram illustrating an example configuration of a transmit amplifier provided in various embodiments of the present disclosure. Transmit amplifier 400 is an example of transmit amplifiers 151 and 251 of FIGS. 1 and 2, and may include a preamplifier 410 for preliminarily amplifying input signals and a switch 415 for switching the preliminarily amplified signals toward a first path or a second path.

Aggregation transmit signals (i.e., transmit signals to be aggregated) may be aggregated and transmitted through a component such as the splitter/combiners 231, 232 included in the first signal processing unit 130 or 230 described above. In this case, power levels of the CA transmit signals may be reduced by the splitter/combiners 231, 232 or other components. If aggregation transmit signals, and non-carrier-aggregation transmit signals (i.e., transmit signals that are not to be carrier aggregated) were to be equivalently subjected to the same power amplification, problems related to output efficiency or power consumption may arise. Therefore, the transmit amplifier 400 may differently amplify the aggregation transmit signals and the non-carrier-aggregation transmit signals.

The transmit amplifier 400 according to the embodiment of the present disclosure may include an aggregation transmit signal amplifying unit 420 for amplifying aggregation transmit signals and a general transmit signal amplifying unit 430 for amplifying non-carrier-aggregation transmit signals.

The aggregation transmit signal amplifying unit 420 may include an aggregation signal amplifier 422 that is configured to have a higher amplification level than the general transmit signal amplifying unit 430, in order to compensate for signal loss in the carrier aggregation operation. Amplifying unit 420 may include a band switching unit 423 for connecting transmit signals to a path corresponding to an output frequency band. In addition, amplifying unit 420 may further include a matching circuit 421 for performing a matching process match impedance in the path so as to realize the peak efficiency of the amplifier 422 at the amplification level configured for the aggregation signal amplifier 422.

The general transmit signal amplifying unit 430 may include an aggregation signal amplifier 432 for which a signal amplification magnitude is set to an amplification level of a transmit signal amplifier provided in communication schemes, such as class3 LTE and WCDMA, which do not use carrier aggregation. The general transmit signal amplifying unit 430 may include a band switching unit 433 for connecting transmit signals to a path corresponding to an output frequency band. In addition, the general transmit signal amplifying unit 430 may further include a matching circuit 431 for performing a matching process to attain the peak efficiency of the amplification level configured for the aggregation signal amplifier 432.

In addition, an amplification level of the aggregation signal amplifier 422 may be set to 26 dBm (providing a 26 dBm output level), and an amplification level of the general signal amplifier 432 may be set to 25 dBm. The matching circuit 421 of the aggregation transmit signal amplifying unit 420 and the matching circuit 431 of the general transmit signal amplifying unit 430 may match impedances to attain the peak efficiency suitable for the set amplification levels of 26 dBm and 25 dBm, respectively.

The connection path of the switch 415 and the connection between the band switching unit 423 of the aggregation transmit signal amplifying unit 420 and the band switching unit 433 of the general transmit signal amplifying unit 430 may be configured by identifying signals received from an external communication network (e.g., a base station). For example, the switch 415 is controlled (via an external control signal or an internal control signal) such that the preamplifier 410 is connected to the aggregation transmit signal amplifying unit 420 when the transmitted/received signals are CA transmit/receive signals and is connected to the general transmit signal amplifying unit 430 when the transmitted/received signals are non-CA transmit/receive signals. In addition, the band switching unit 423 of the aggregation transmit signal amplifying unit 430 and the band switching unit 433 of the general transmit signal amplifying unit 430 may identify the bands used in transmitting/receiving of the signals and control switch paths such that outputs are connected to the ports and duplexers designated for the corresponding bands.

As described above, according to the various embodiments of the present disclosure, even when a single antenna is provided, it is possible to transmit/receive signals in various bands through diverse methods. That is, even if carrier-aggregated receive signals consist of signals in multiple low bands of 1 GHz or lower, signals in multiple high bands of 1.7 GHz or higher, or a signal in a low band of 1 GHz or lower and a signal in a high band of 1.7 GHz or higher, it is possible to transmit/receive carrier-aggregated signals and non-CA signals by using a single antenna.

In addition, according to the various embodiments of the present disclosure, carrier-aggregated signals and non-carrier-aggregated signals can be transmitted and received through separate hardware paths, thereby making it possible to transmit/receive signals with minimal or reduced power consumption and/or a reduction in requisite receiver sensitivity.

Furthermore, according to the various embodiments of the present disclosure, the configuration capable of optimizing carrier-aggregated signals can be provided, thereby minimizing signal loss caused by the transmission/reception of the carrier-aggregated signals.

The above described components of the electronic device according to various embodiments of the present disclosure may be formed of one or more components, and a name of a corresponding component element may be changed based on the type of electronic device. The electronic device according to the present disclosure may include one or more of the aforementioned components or may further include other additional components, or some of the aforementioned components may be omitted. Further, some of the components of the electronic device according to the various embodiments of the present disclosure may be combined to form a single entity, and thus, may equivalently execute functions of the corresponding elements prior to the combination.

A module or a programming module according to the present disclosure may include at least one of the described component elements, some of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Embodiments of the present disclosure provided in the present specifications and drawings are merely certain examples to readily describe the technology associated with embodiments of the present disclosure and to help understanding of the embodiments of the present disclosure, but may not limit the scope of the claimed subject matter as defined by the appended claims. Therefore, in addition to the embodiments disclosed herein, the scope of the various embodiments of the present disclosure should be construed to include all modifications or modified forms drawn based on the technical idea of the various embodiments of the present disclosure.

What is claimed is:

1. An electronic device for processing communication signals, comprising:
    an antenna;
    a switching unit connected to the antenna and operative to switch toward different paths, a first receive signal which uses carrier aggregation and a second receive signal which does not use carrier aggregation, and to switch first and second transmit signals applied from the different paths, which use and do not use carrier aggregation, respectively, to the antenna;
    a first signal processing unit configured to provide a first aggregation receive signal and a second aggregation receive signal by splitting the first receive signal provided by the switching unit using at least one splitter, to provide the first transmit signal by integrating a first aggregation transmit signal and a second aggregation transmit signal to the switching unit and to process the first aggregation receive signal and the second aggregation receive signal and the first transmit signal;
    a second signal processing unit that processes the second receive signal provided by the switching unit and the second transmit signal to be applied to the switching unit; and
    a transmit/receive (T/R) unit comprising a receive amplifier that amplifies each of the first and second aggregation receive signals, and the second receive signal output from the second signal processing unit.

2. The electronic device of claim 1, wherein the T/R unit comprises a first receiver that amplifies each of the first and second aggregation receive signals, and second receiver for amplifying the second receive signal output from the second signal processing unit, the first receiver having a higher receiver sensitivity than the second receiver.

3. The electronic device of claim 1, wherein the first receive amplifier of the T/R unit comprises:

a first amplifier that amplifies at least one of the first and second aggregation receive signals, wherein the first amplifier is manufactured through GaAS die-casting.

4. The electronic device of claim 1, wherein the T/R unit comprises:
a second amplifier that amplifies the second receive signal output from the second signal processing unit, wherein the second amplifier is manufactured through CMOS die-casting.

5. The electronic device of claim 1, wherein the T/R unit is configured by packaging a first amplifier that amplifies at least one of the first and second aggregation receive signals and a second amplifier that amplifies the second receive signal output from the second signal processing unit, wherein the first amplifier is manufactured through GaAS die-casting, and the second amplifier is manufactured through CMOS die-casting.

6. The electronic device of claim 1, further comprising:
a transmit amplifier that amplifies the first and second aggregation transmit signals and the second transmit signal to different levels.

7. The electronic device of claim 6, wherein the level to which the second transmit signal is amplified is lower than that to which the first and second aggregation transmit signals are amplified.

8. The electronic device of claim 1, wherein the T/R unit further comprises:
a first switching unit that switches an input signal toward a first path or a second path;
a first transmit amplifier provided on the first path and that amplifies each of the first and second aggregation transmit signals to a first level; and
a first band switching unit that connects the first and second aggregation transmit signals amplified to the first level to respective first and second duplexers, each corresponding to a band, to transmit the signals.

9. The electronic device of claim 8, wherein the T/R unit further comprises:
a matching circuit that is connected to the first transmit amplifier and matches power of the first and second aggregation transmit signals such that peak efficiency is obtained at the first level.

10. The electronic device of claim 8, wherein the T/R unit further comprises:
a second transmit amplifier that is provided at the second path and amplifies the second transmit signal to a second level; and
a second band switching unit that connects the second transmit signal amplified to the second level to a duplexer corresponding to a band to transmit the second transmit signal.

11. The electronic device of claim 10, wherein the T/R unit further comprises:
a matching circuit that is connected to the second transmit amplifier and matches impedance in the second path such that peak efficiency is obtained at the second level.

12. The electronic device of claim 1, wherein the first signal processing unit comprises:
a splitter that splits the first receive signal in first and second bands to provide the first and second aggregation receive signals and integrates the first aggregation transmit signal in the first band and the second aggregation transmit signal in the second band to form the first transmit signal.

13. The electronic device of claim 12, wherein the first signal processing unit further comprises:

a first duplexer that passes the first aggregation receive and transmit signals therethrough; and
a second duplexer that passes the second aggregation receive and transmit signals therethrough.

14. The electronic device of claim 1, wherein the first receive signal comprises first and second carrier-aggregated (CA) receive signals, and the at least one splitter comprises:
a first splitter that splits the first CA receive signal in a higher band and integrates transmit signals comprising at least one of the first and second transmit aggregation signals in a higher band; and
a second splitter that splits the second CA receive signal in a lower band and integrates transmit signals comprising at least one of the first and second transmit aggregation signals in a lower band,
wherein the first transmit signal is formed from at least two of the transmit signals output from the first and second splitters.

15. The electronic device of claim 14, wherein the higher band is a band of 1.7 GHz or greater, and the lower band is a band of 1 GHz or lower.

16. The electronic device of claim 14, wherein the first signal processing unit further comprises:
a plurality of duplexers that are connected to the first splitter and pass signals in different bands therethrough; and
a plurality of duplexers that are connected to the second splitter and pass signals in different bands therethrough.

17. An electronic device for processing communication signals, comprising:
an antenna;
a switching unit connected to the antenna and operative to switch toward different paths, a first receive signal which uses carrier aggregation and a second receive signal which does not use carrier aggregation, and to switch first and second transmit signals applied from the different paths, which use and do not use carrier aggregation, respectively, to the antenna;
a first signal processing unit configured to provide a first aggregation receive signal and a second aggregation receive signal by splitting the first receive signal provided by the switching unit using at least one splitter, to provide the first transmit signal by integrating a first aggregation transmit signal and a second aggregation transmit signal to the switching unit and to process the first aggregation receive signal and the second aggregation receive signal and the first transmit signal;
a second signal processing unit that processes the second receive signal provided by the switching unit and the second transmit signal to be applied to the switching unit; and
a transmit/receive unit comprising at least one of: i) a receive amplifier that amplifies one of the first and second aggregation receive signals using a receiver configured for a first receiving sensitivity and the second receive signal output from the second signal processing unit using a receiver configured for a second receiving sensitivity, and, ii) a transmit amplifier that amplifies at least one of the first and second transmit aggregation signals, and the second transmit signal, to different levels.

18. A method for processing communication signals, comprising:
receiving, by an antenna, a first receive signal which uses carrier aggregation and a second receive signal which does not use carrier aggregation;

switching the first and second receive signals towards first and second paths, respectively;

splitting the first receive signal switched to the first path into a first aggregation receive signal and a second aggregation receive signal using at least one splitter;

processing the second receive signal switched to the second path;

amplifying at least one of the first and second aggregation receive signals with receiver circuitry having a first receiver sensitivity;

amplifying the processed second receive signal with receiver circuitry having a second receiver sensitivity;

transmitting a first transmit signal that uses carrier aggregation via the first path and a second transmit signal that does not use carrier aggregation via the second path; and switching the first and second transmit signals from the first and second paths to the antenna.

* * * * *